United States Patent [19]

Nimry et al.

[11] 4,366,304
[45] Dec. 28, 1982

[54] COPOLYIMIDES FROM ALIPHATIC AND AROMATIC ANHYDRIDES AND DIAMINES

[75] Inventors: Tayseer S. Nimry, Wheaton; Ellis K. Fields, River Forest, both of Ill.

[73] Assignee: Standard Oil Company (Indiana), Chicago, Ill.

[21] Appl. No.: 286,697

[22] Filed: Jul. 24, 1981

[51] Int. Cl.$^3$ .............................................. C08G 73/10
[52] U.S. Cl. .................................... 528/189; 528/125; 528/128; 528/188; 528/206; 528/208; 528/220; 528/229; 528/352; 528/353
[58] Field of Search ............... 528/353, 352, 172, 125, 528/128, 188, 189, 206, 208, 220, 229

[56] References Cited

U.S. PATENT DOCUMENTS 2,489,725  1/1970  Lucas ................................. 528/353
3,073,784  1/1963  Endrey ................................ 528/353

FOREIGN PATENT DOCUMENTS 2519671  11/1975  Fed. Rep. of Germany ...... 528/353

OTHER PUBLICATIONS

Nakanishi et al., *Polymers,* 14, 440, (1973).

*Primary Examiner*—Lester L. Lee
*Attorney, Agent, or Firm*—Gunar J. Blumberg; William T. McClain; William H. Magidson

[57] ABSTRACT

Novel copolyimides are prepared from mixtures of tetramethyl-cyclobutane-1,2,3,4-tetracarboxylic dianhydride and other aliphatic and aromatic dianhydrides. Their dianhydride mixtures are reacted with aliphatic or aromatic diamines to form copolyimides which are useful as engineering plastics.

84 Claims, No Drawings

COPOLYIMIDES FROM ALIPHATIC AND AROMATIC ANHYDRIDES AND DIAMINES

BACKGROUND OF THE INVENTION

FIELD OF THE INVENTION

The field of this invention relates to copolyimides prepared from mixtures of tetramethylcyclobutane-1,2,3,4-tetracarboxylic dianhydride (TMCDA) and aromatic or aliphatic dianhydrides. These dianhydride mixtures are then reacted with aliphatic or aromatic diamines. These novel copolyimides are useful in the preparation of molded articles, fibers, films, laminates and coatings.

BACKGROUND

It is known to make polyimides from pyromellitic dianhydride and diamines. (See U.S. Pat. No. 3,179,634 (1965).) British Pat. No. 570,858 discloses various processes for making fiber forming polyimides. The following Japanese patents disclose the preparation of polyimides starting with cyclobutane-1,2,3,4-tetracarboxylic dianhydride. F. Nakanishi and M. Hasegawa, Polymers, 14, 440 (1973). JA7123917-S27, JA7137733-S44, JA137734-S44, JA7219710-T23 and JA7219908-T23. In reviewing the references, it is clear the use of TMCDA and aromatic or aliphatic dianhydrides to form copolyimides useful as moldings, fibers, laminates, and coatings has not been contemplated in the prior art. The general object of this invention is to provide novel copolyimides based on mixtures of TMCDA and other dianhydride moieties that are then reacted with either aliphatic, cycloaliphatic, araliphatic or aromatic diamines. Another object is to provide a process for the manufacture of copolyimides from TMCDA-other dianhydrides and diamines.

We have found that novel copolyimides can be prepared by reacting TMCDA and aromatic or aliphatic dianhydrides with diamines. In this process TMCDA and another dianhydride are mixed together in proportions of about 1:10 to 10:1 and these are then reacted with a diamine in a polar nitrogen containing solvent to form high molecular weight copolyimides. In this process both aliphatic, cycloaliphatic, araliphatic and aromatic diamines can be copolymerized with TMCDA and aromatic or aliphatic dianhydrides to form high molecular weight copolyimides.

Suitably, in our process for the manufacture of the novel copolyimides a mixture of the TMCDA-aromatic or aliphatic dianhydride is reacted with a primary diamine or a mixture of primary diamines. The molar ratio of the TMCDA dianhydride mixture to the primary diamine may be in the range of 1.2:1 to 1:1.2, preferably in the range of 1 to 1. Advantageously, the reaction is carried out at a temperature of about 180° to 210° C. for a period of about 4 to 6 hours in a nitrogen containing organic polar solvent such as 1-methyl-2-pyrrolidinone, N,N-dimethylacetamide or pyridine. The polycondensation can suitably be carried out at a temperature of 130° to 250° C. preferably at a temperature of 180° to 210° C. The water by-product in the polycondensation may be distilled off at 100°–150° C. or removed by a stream of nitrogen. It can also be azeotroped with an organic solvent such as xylene. The polymerization reaction can be carried out in the melt under an inert atmosphere or in vacuum. The novel copolyimides of this invention have the following recurring structure wherein R is a divalent aliphatic or aromatic hydrocarbon radical and R' is a tetravalent aliphatic or aromatic hydrocarbon radical.

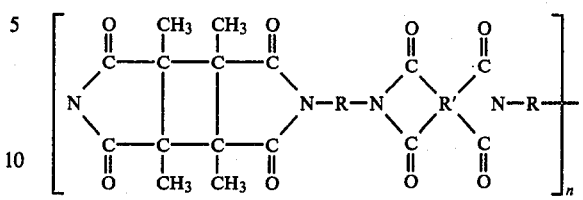

The radical R may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene,

—SO—, SO₂—, and —S— radicals.

The preferred structures for R are the following: —(CH₂)₆—; —(CH₂)₁₂—;

The preferred structures for R' are one of the following:

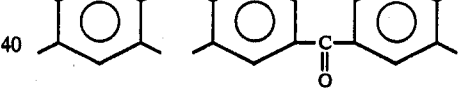

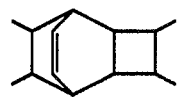

The radical R is derived from aliphatic, araliphatic or cycloaliphatic diamines such as ethylenediamine, propylenediamine, 2,2-dimethylpropylenediamine, tetramethylenediamine, hexamethylenediamine, octamethylenediamine, nonamethylenediamine, decamethylenediamine, dodecamethylenediamine, 4,4'-diaminodicyclohexylmethane, xylylene diamine and bis (aminomethyl) cyclohexane; suitable aromatic diamines useful in our process include para- and meta-phenylenediamine, 4,4'-oxydianiline, thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamines are 4,4'-oxydianiline, 1,12-dodecanediamine, and 1,6-hexane-diamine.

The dianhydrides are characterized by the following formula:

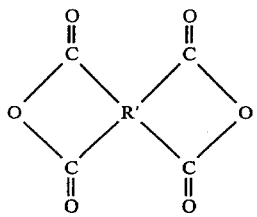

wherein R' is a tetravalent organic radical selected from the group consisting of aromatic, aliphatic, cycloaliphatic, heterocyclic, combination of aromatic and aliphatic, and substituted groups thereof. However, the preferred dianhydrides are those in which the R' groups have at least 6 carbon atoms characterized by benzenoid unsaturation, i.e. alternate double bonds in a ring structure, wherein the 4 carbonyl groups of the dianhydride are each attached to separate carbon atoms and wherein each pair of carbonyl groups is directly attached to adjacent carbon atoms in the R' group to provide a 5-membered ring as follows:

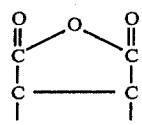

The preferred dianhydrides, as recited above when mixed with TMCDA, yield upon reaction with the diamines copolyimide structures having outstanding physical properties. Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl) propane dianhydride; 2,3,4,5-pyrrolidine tetracarboxylic dianhydride; 3,4,9,10-perylene tetracarboxylic dianhydride; bis(3,4-dicarboxyphenyl) ether dianhydride; ethylene tetracarboxylic dianhydride; 3,3',4,4'-benzophenonetetracarboxylic dianhydride; bis(3,4-dicarboxyphenyl)sulfide dianhydride; bis(3,4-dicarboxyphenyl)sulfone dianhydride; bis(3,4-dicarboxyphenyl)methane dianhydride; 1,4,5,8-naphthalenetetracarboxylic dianhydride, tricyclo [4,2,2,0$^{2,5}$] dec-7-ene-3,4,9,10-tetracarboxylic dianhydride, 3,6-ethenohexahydropyromellitic dianhydride, cyclobutane-1,2,3,4-tetracarboxylic dianhydride, and 1,3-dimethylcyclobutane-1,2,3,4-tetracarboxylic dianhydride. The preferred dianhydride is 3,3$^1$,4,4$^1$-benzophenonetetracarboxylic dianhydride.

In some cases the copolyimide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the copolyimide and can be conducted in several ways. However all techniques require heating the ground or pelletized copolyimide below the melting point of the copolyimide, generally at a temperature of about 180° to 210° C. while either sparging with an inert gas as nitrogen or operating under vacuum. In cases where the polyimides have a low melt temperature, they can be copolymerized in the melt under vacuum in thin sections or using thin film reactors known in the art.

Injection molding of the novel copolyimide is accompanied by injecting the copolyimide into a mold maintained at a temperature of about 50° C. to 150° C. In this process a 20 second to 1 minute cycle is used with a barrel temperature of about 200° C. to 350° C. The latter will vary depending on the $T_g$ of the polymer being molded.

The novel copolyimides have excellent mechanical and thermal properties and can readily be molded, formed into fibers, films, laminates or coatings.

Thermal analysis of the copolyimide by thermal gravimetric analysis shows excellent stability. This is demonstrated by the fact that under nitrogen atmosphere 1% weight loss occurs at a temperature of about 320° to 400° C. and the main weight loss occurs at a temperature of about 365° to 435° C. Glass temperature ($T_g$) of the polyimide varied with the particular diamine used, as shown in Table 2 and the dianhydride mixture values range from a $T_g$ of 60° to 150° C.

Diamines are suitably copolymerized with TMCDA and aromatic or aliphatic dianhydrides by solution condensation in organic polar solvents. Useful polar solvents include N,N-dimethylacetamide, 1-methyl-2-pyrrolidinone, N,N-dimethylformamide, dimethylsulfoxide, pyridine and the like. Suitable dianhydrides include pyromellitic dianhydride (PMDA), 3,3',4,4'-benzophenone tetracarboxylic dianhydride (BTDA), and the tricyclic tetracarboxylic dianhydride, tricyclo[4,2,-2,O$^{2,5}$] dec-7-ene-3,4,9,10-tetracarboxylic dianhydride (TTDA) which is a 2:1 photo-adduct of maleic anhydride and benzene.

The copolyimide was cast into films. The films were heated at a temperature of 120° C. for one hour. The dry film was 50 microns in thickness and was yellow or white.

The copolyimides of this invention are improved by the addition of reinforcing material; particularly the mechanical properties of the copolyimides are improved if these copolyimides contain from about 25 to 60 percent by weight glass fibers, glass beads, or graphite or mixtures thereof. In the preferred range the polyimides contain 30 to 40 percent by weight of the glass fibers, glass beads, or graphite or mixtures thereof. Suitable reinforcing materials can be glass fibers, glass beads, glass spheres, glass fabrics. The glass fibers are made of alkali-free boron-silicate glass or alkali containing C-glass. The thickness of the fiber is suitably on the average between 3 mm and 30 mm. It is possible to use both long fiber with average lengths of from 5 to 50 mm and short fibers which have an average filament length from 0.05 to 5 mm. In principle, any standard commercial-grade fibers especially glass fibers may be used. Glass beads ranging from 5 mm to 50 mm in diameter may also be used as a reinforcing material.

The reinforced copolyimide polymers may be prepared in various ways. For example, so called rovings endless glass fiber strands are coated with the polyamic acid and subsequently granulated. The cut fibers or the glass beads may also be mixed with polyamic acid solution and the resulting mixture is heated to give the reinforced polyimide. Injection molding of the novel glass-filled polyimide is accomplished by injecting the polyimide into a mold maintained at a temperature of about 50° to 150° C. In this process a 20 second cycle is used with a barrel temperature of about 200° to 350° C. The injection molding conditions are given in Table 1.

TABLE I

| Mold Temperature | 50 to 150° C. |
|---|---|
| Injection Pressure | 15,000 to 19,000 psi and held for 1 to 3 seconds |
| Back Pressure | 100 to 220 psi |
| Cycle Time | 20 seconds |
| Extruder: | |
| Nozzle Temperature | 200 to 350° C. |
| Barrels: | |
| Front heated to | 200 to 350° C. |
| Screw: | |
| 20 to 25 revolutions/minute | |

The following examples illustrate the preferred embodiment of the invention. It will be understood that the examples are for illustrative purposes only and do not purport to be wholly definitive with respect to conditions or scope of the invention. Furthermore, the structures given are not intended to convey block-type copolymers but are shown here to illustrate one possible arrangement.

EXAMPLE 1

The polycondensation reaction was carried out under a nitrogen atmosphere and anhydrous conditions. 4,4'-oxydianiline (ODA) (0.0125 mole) was placed in a three-neck flask containing a teflon-coated magnetic stirrer; it was then dissolved in 30–50 ml 1-methyl-2-pyrrolidinone (NMP). The equimolar mixture (0.0125 mole) of tetramethylcyclobutane-1,2,3,4-tetracarboxylic dianhydride (TMCDA) and pyromellitic dianhydride (PMDA) was then added to the flask through a dried powder funnel over a 10 minute period. The funnel was then washed with enough NMP to make approximately a 10% solution. The reaction vessel was heated in an oil bath to 190°–200° C. for 4 hours. The copolyimides were generally precipitated from solution by mixing with water in a blender, then dried in a vacuum oven at 100° C. for 10 hours. The yields were in excess of 80%, usually 95%. Elemental Analysis was the following:

| | C | H | N |
|---|---|---|---|
| Found: | 68.36 | 4.79 | 7.02 |
| Calcd: | 69.17 | 3.76 | 7.02 |

EXAMPLE 2

The procedure of Example 1 was repeated except that the diamine used was hexamethylenediamine (HMDA). The inherent viscosity (I.V.) for this copolyimide determined for a solution made by dissolving 0.1 g of the polyimide in 25 ml of a mixture of 60/40 phenol-tetrachloroethane (P/TCE) at 130° C. then cooling to 30° C., a procedure used for all the other polymers in the following examples, was found to be 0.55. A good film was cast by spreading the polyimide solution on a glass plate and drying in a vacuum oven at 120° C. for 1 hr. Elemental Analysis was the following:

| | C | H | N |
|---|---|---|---|
| Found: | 64.59 | 6.59 | 8.90 |
| Calcd: | 66.06 | 5.81 | 8.56 |

EXAMPLE 3

The procedure of Example 1 was repeated except that the diamine used was 1,12-dodecanediamine (DDA). The I.V. for this copolyimide was 0.33 determined in P/TCE. Elemental Analysis was the following:

| | C | H | N |
|---|---|---|---|
| Found: | 69.16 | 8.20 | 6.70 |
| Calcd: | 69.17 | 7.77 | 7.02 |

EXAMPLE 4

The polycondensation reaction was carried out under a nitrogen atmosphere and anhydrous conditions. ODA (0.0125 mole) was placed in a three-neck flask containing a teflon-coated magnetic stirrer and dissolved in 30–50 ml NMP. To this solution 0.0125 mole of an equimolar mixture of TMCDA and 3,3',4,4'-benzophenone tetracarboxylic dianhydride (BTDA) was added through a dried powder funnel over a 10-minute period. The funnel was then washed with enough NMP to make approximately a 10% solution. The reaction vessel was heated in an oil bath to 190°–200° C. for 4 hours. The copolyimides were generally precipitated from solution by mixing with water in a blender, and then dried in a vacuum oven at 110° C. for 10 hours.

The I.V. for this copolyimide was 0.42 determined in P/TCE and it formed a good film when its solution in NMP was cast on a glass plate and dried at 120° C. for 1 hr. Elemental Analysis was the following:

| | C | H | N |
|---|---|---|---|
| Found: | 69.40 | 3.13 | 6.79 |
| Calcd: | 70.51 | 2.76 | 6.45 |

EXAMPLE 5

The procedure of Example 4 was repeated except that the diamine used was hexamethylenediamine (HMDA). The I.V. for this copolyimide was 0.37 determined in P/TCE and it cast a good film. Elemental Analysis was the following:

| | C | H | N |
|---|---|---|---|
| Found: | 66.62 | 6.29 | 7.43 |
| Calcd: | 65.92 | 5.92 | 7.89 |

EXAMPLE 6

The procedure of Example 5 was repeated except that the I.V. for this copolyimide was determined in NMP using the same conditions described for P/TCE in Example 2. The I.V. of the copolyimide was 0.34. Elemental Analysis was the following:

| | C | H | N |
|---|---|---|---|
| Found: | 67.14 | 6.43 | 7.42 |
| Calcd: | 65.92 | 5.92 | 7.89 |

EXAMPLE 7

The procedure of Example 4 was repeated except that the diamine used was DDA. The I.V. of this copolyimide was 0.26 determined in P/TCE. Elemental Analysis was the following:

|        | C     | H    | N    |
|--------|-------|------|------|
| Found: | 71.19 | 8.39 | 6.10 |
| Calcd: | 69.70 | 7.52 | 6.38 |

EXAMPLE 8

The polycondensation reaction was carried out under a nitrogen atmosphere and anhydrous conditions. ODA (0.0125 mole) was placed in a three-neck flask containing a teflon-coated magnetic stirrer. It was then dissolved in 30 to 50 ml of NMP. To the diamine solution, 0.0125 mole of an equimolar mixture of TMCDA and the tricyclic tetracarboxylic dianhydride tricyclo [4,2,2,$O^{2,5}$] dec-7-ene-3,4,9,10-tetracarboxylic dianhydride, (TTDA) which is a 2:1 photo-adduct of maleic anhydride and benzene, was added through a dried powder funnel over a ten minute period. The funnel was then washed with enough NMP to make approximately a 10 percent solution. The reaction vessel was heated in an oil bath to 190°–200° C. for four hours. The copolyimide was precipitated from solution by mixing with water in a blender, and then dried in a vacuum oven at 110° C. for ten hours. The I.V. for this copolyimide was 1.14 determined in P/TCE and it cast a good film. Elemental Analysis was the following:

|        | C     | H    | N    |
|--------|-------|------|------|
| Found: | 68.20 | 4.00 | 6.77 |
| Calcd: | 70.26 | 4.45 | 6.56 |

EXAMPLE 9

The procedure of Example 8 was repeated except that the diamine was HMDA. The I.V. of this copolyimide was 0.77 determined in P/TCE and it cast a good film. Elemental Analysis was the following:

|        | C     | H    | N    |
|--------|-------|------|------|
| Found: | 66.38 | 6.87 | 8.28 |
| Calcd: | 67.60 | 6.45 | 7.89 |

EXAMPLE 10

The procedure of Example 8 was repeated except that the diamine used was DDA. The I.V. for this copolyimide was 0.24 determined in P/TCE and it cast a good film. Elemental Analysis was the following:

|        | C     | H    | N    |
|--------|-------|------|------|
| Found: | 69.45 | 9.84 | 6.54 |
| Calcd: | 70.26 | 8.20 | 6.56 |

EXAMPLE 11

The procedure of Example 2 was repeated except the molar ratio of TMCDA to PMDA was 1:3. The I.V. for this copolyimide was 0.75 determined in P/TCE. Elemental Analysis was the following:

|        | C     | H    | N    |
|--------|-------|------|------|
| Found: | 64.1  | 5.06 | 8.60 |
| Calcd: | 64.60 | 5.38 | 9.30 |

EXAMPLE 12

The procedure of Example 3 was repeated using the same dianhydride mixture of Example 11. The I.V. for this copolyimide was 1.0 determined in P/TCE. Elemental Analysis was the following:

|        | C     | H    | N    |
|--------|-------|------|------|
| Found: | 68.93 | 7.24 | 6.38 |
| Calcd: | 69.14 | 7.30 | 7.17 |

EXAMPLE 13

The procedure of Example 5 was repeated except the molar ratio of TMCDA to BTDA was 1:3. The I.V. for this copolyimide was 0.27 determined in P/TCE. Elemental Analysis was the following:

|        | C     | H    | N    |
|--------|-------|------|------|
| Found: | 66.06 | 5.02 | 7.29 |
| Calcd: | 67.88 | 5.07 | 7.28 |

EXAMPLE 14

The procedure of Example 7 was repeated using the dianhydride mixture of Example 13. The I.V. for this copolyimide was 0.36 determined in P/TCE. Elemental Analysis was the following:

|        | C     | H    | N    |
|--------|-------|------|------|
| Found: | 70.90 | 6.77 | 5.8  |
| Calcd: | 71.08 | 6.72 | 5.98 |

EXAMPLE 15

The procedure of Example 9 was repeated except the molar ratio of TMCDA to TTDA was 1:3. The I.V. of this copolyimide was 0.78 determined in P/TCE. Elemental Analysis was the following:

|        | C     | H    | N    |
|--------|-------|------|------|
| Found: | 66.21 | 6.55 | 8.27 |
| Calcd: | 67.14 | 6.46 | 8.03 |

EXAMPLE 16

The procedure of Example 10 was repeated using the dianhydride mixture of Example 15. The I.V. of this copolyimide was 0.61 determined in P/TCE. Elemental Analysis was the following:

|        | C     | H    | N    |
|--------|-------|------|------|
| Found: | 69.74 | 7.97 | 7.49 |
| Calcd: | 70.75 | 7.98 | 6.47 |

EXAMPLE 17

Table 2 hereinbelow lists the various properties for dianhydrides prepared according to the procedure set forth in Examples 1 through 16. These thermal properties were measured under $N_2$. Thermogravimetric analysis (TGA) data were obtained on a Perkin-Elmer TGS-2 Thermogravimetric system using a heating rate of 10° C./min. The differential scanning colororimetry (DSC) measurements were made on a DuPont 990 DSC Thermal Analyzer using a heating rate of 20° C./min. and a cooling rate of 10° C./min.

TABLE 2

| Run # | Dianhydride | Molar ratio | Diamine | TGA Wt. loss at T, °C. Onset | TGA Wt. loss at T, °C. 1% | Tm, °C. 1st Heat | Tg, °C. |
|---|---|---|---|---|---|---|---|
| 1 | TMCDA + PMDA | (1:1) | HMDA | 400 | 435 | None | 137 |
| 2 | TMCDA + PMDA | (1:3) | HMDA | 390 | 435 | None | 144 |
| 3 | TMCDA + PMDA | (1:1) | DDA | 325 | 425 | 219,237 | 61 |
| 4 | TMCDA + PMDA | (1:3) | DDA | 350 | 435 | 257,237 | 76 |
| 5 | TMCDA + BTDA | (1:1) | HMDA | 410 | 430 | None | 136 |
| 6 | TMCDA + BTDA | (1:3) | HMDA | 380 | 410 | 211 | 132 |
| 7 | TMCDA + BTDA | (1:3) | DDA | 375 | 410 | None | 72 |
| 8 | TMCDA + BTDA | (1:3) | DDA | 350 | 405 | None | 76 |
| 9 | TMCDA + TTDA | (1:1) | HMDA | 345 | 375 | None | 149 |
| 10 | TMCDA + TTDA | (1:3) | HMDA | 320 | 365 | 210 | 171 |
| 11 | TMCDA + TTDA | (1:1) | DDA | 320 | 365 | 179 | 83 |
| 12 | TMCDA + TTDA | (1:3) | DDA | 340 | 370 | 197 | 93 |

EXAMPLE 18

Starting materials—The dianhydride, TMCDA, was prepared from maleic anhydride according to literature procedures. Treatment of maleic anhydride in boiling acetic acid and in the presence of 2-aminopyridine gives with decarboxylation 2,3-dimethylmaleic anhydride (M. E. Baumann and H. Bosshard, *Helv. Chim. Acta,* 16, 2751 (1978)). This compound is then converted to its dimer by irradiating its benzene solution sensitized by benzophenone with ultraviolet light for several hours. The resulting photodimer was recrystallized from acetic anhydride or a large volume of acetone. The literature procedure (G. D. Schenk, W. Hartmann, S. P. Mansfeld, W. Metzner, and C. H. Krauch, *Chem. Ber.,* 95, 1642 (1962)) was improved considerably by us by using a weak UV source through Pyrex. This has the great advantage over Schenk et al, who used a medium-pressure mercury arc through quartz. Our improved method makes possible the manufacture of TMCDA by a continuous process of pumping a benzene solution of dimethylmaleic anhydride plus 1-7 wt% of benzophenone in benzene around Pyrex glass piping under irradiation by the sun, i.e., using cheap and inexhaustible solar radiation.

We claim:

1. A copolyimide of the following recurring structure:

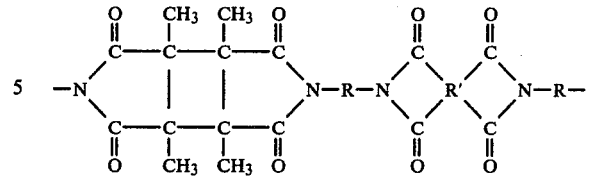

wherein R is a divalent aliphatic or aromatic hydrocarbon radical or an aromatic hydrocarbon radical containing 6 to 10 carbon atoms joined directly or by a stable linkage selected from the group consisting of —O—, methylene,

—SO—, —SO$_2$— and —S— radicals and R' a tetravalent aliphatic or aromatic radical.

2. The polymer of claim 1 wherein R and R' are aliphatic hydrocarbons from 2 to 18 carbon atoms.
3. The copolyimide of claim 1 wherein R and R' are aromatic hydrocarbons from 6 to 20 carbon atoms.
4. The copolyimide of claim 1 wherein the aromatic hydrocarbon radical contains from 6 to 10 carbon atoms joined directly or by stable linkage selected from the group consisting essentially of —O—, methylene,

—SO—, —SO$_2$— and —S— radicals.

5. The copolyimide of claim 1 wherein the copolyimide is in the form of a molded object.
6. The copolyimide of claim 1 wherein the copolyimide is in the form of a laminate.
7. The copolyimide of claim 1 wherein the copolyimide is in the form of a film.
8. The polyimide of claim 1 wherein the copolyimide is in the form of a metal coating suitable for electrical service.
9. A copolyimide of the following recurring structure

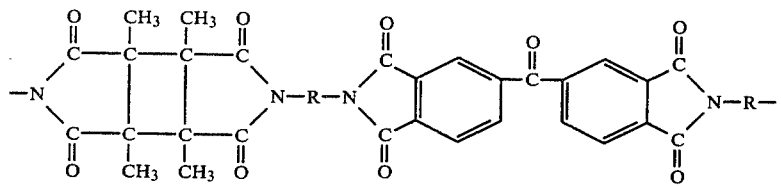

wherein R is a divalent aliphatic or aromatic hydrocarbon radical.

10. A copolyimide of claim 9 wherein the copolyimide is in the form of a molded object.

11. The copolyimide of claim 9 wherein the copolyimide is in the form of a laminate.

12. The copolyimide of claim 9 wherein the copolyimide is in the form of a film.

13. A copolyimide of the following recurring structure:

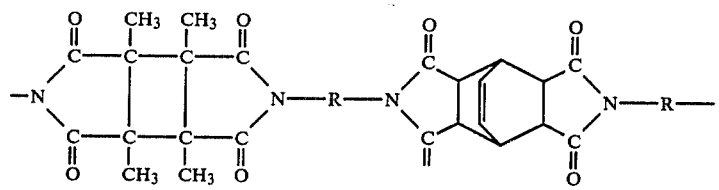

wherein R is a divalent aliphatic or aromatic hydrocarbon radical.

14. The copolyimide of claim 13 wherein the copolyimide is in the form of a molded object.

15. The copolyimide of claim 13 wherein the copolyimide is in the form of a laminate.

16. The copolyimide of claim 13 wherein the copolyimide is in the form of a film.

17. A copolyimide of the following recurring structure:

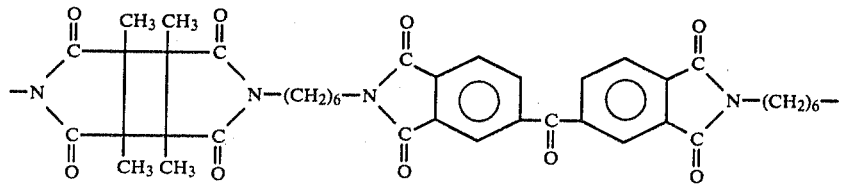

18. The copolyimide of claim 17 wherein the copolyimide is in the form of a molded object.

19. The copolyimide of claim 17 wherein the copolyimide is in the form of a laminate.

20. The copolyimide of claim 17 wherein the copolyimide is in the form of a film.

21. A copolyimide of the following recurring structure:

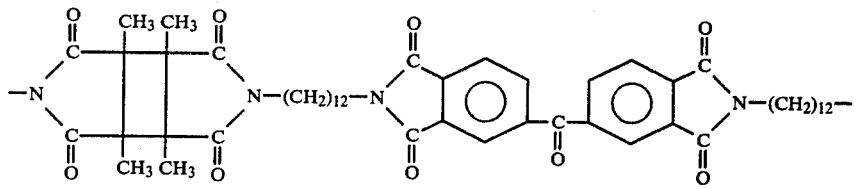

22. The copolyimide of claim 21 wherein the copolyimide is in the form of a molded object.

23. The copolyimide of claim 21 wherein the copolyimide is in the form of a laminate.

24. The copolyimide of claim 21 wherein the copolyimide is in the form of a film.

25. A copolyimide of the following recurring structure:

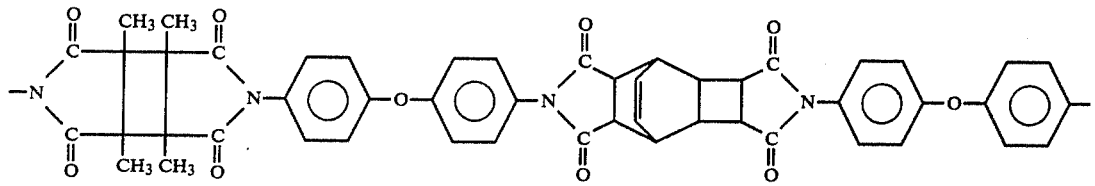

26. The copolyimide of claim 25 wherein the copolyimide is in the form of a molded object.

27. The copolyimide of claim 25 wherein the copolyimide is in the form of a laminate.

28. The copolyimide of claim 25 wherein the copolyimide is in the form of a film.

29. A copolyimide of the following recurring structure:

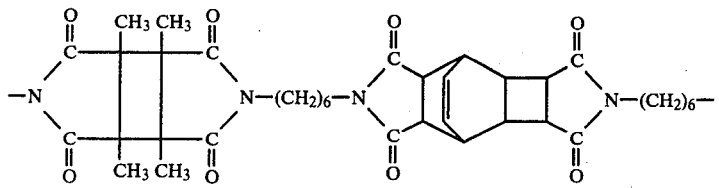

30. The copolyimide of claim 29 wherein the copolyimide is in the form of a molded object.

31. The copolyimide of claim 29 wherein the copolyimide is in the form of a laminate.

32. The copolyimide of claim 29 wherein the copolyimide is in the form of a film.

33. A copolyimide of the following recurring structure:

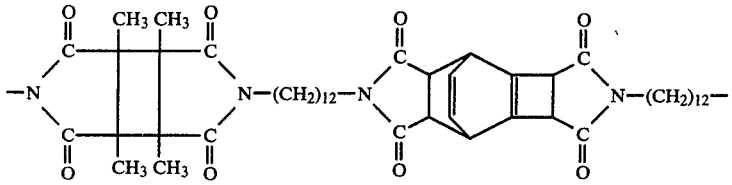

34. The copolyimide of claim 33 wherein the copolyimide is in the form of a molded object.

35. The copolyimide of claim 33 wherein the copolyimide is in the form of a laminate.

36. The copolyimide of claim 33 wherein the copolyimide is in the form of a film.

37. A copolyimide of the following recurring structure:

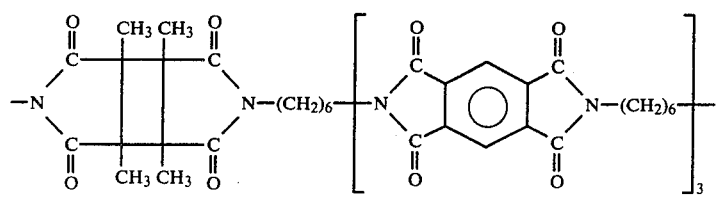

38. The copolyimide of claim 37 wherein the copolyimide is in the form of a molded object.

39. The copolyimide of claim 37 wherein the copolyimide is in the form of a laminate.

40. The copolyimide of claim 37 wherein the copolyimide is in the form of a film.

41. A copolyimide of the following recurring structure:

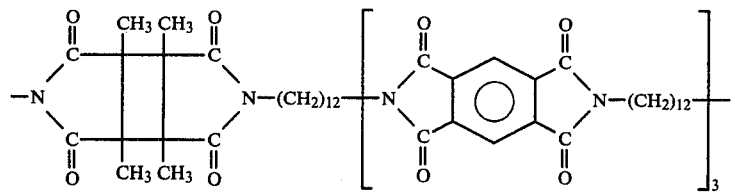

42. The copolyimide of claim 41 wherein the copolyimide is in the form of a molded object.

43. The copolyimide of claim 41 wherein the copolyimide is in the form of a laminate.

44. The copolyimide of claim 41 wherein the copolyimide is in the form of a film.

45. A copolyimide of the following recurring structure:

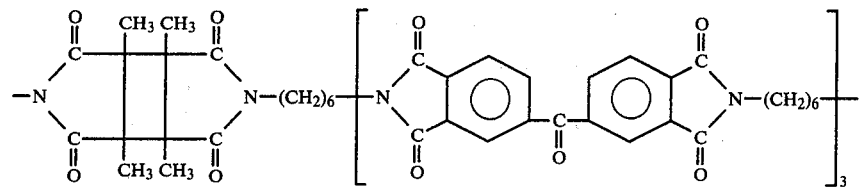

46. The copolyimide of claim 45 wherein the copolyimide is in the form of a molded object.

47. The copolyimide of claim 45 wherein the copolyimide is in the form of a laminate.

48. The copolyimide of claim 45 wherein the copolyimide is in the form of a film.

49. A copolyimide of the following recurring structure:

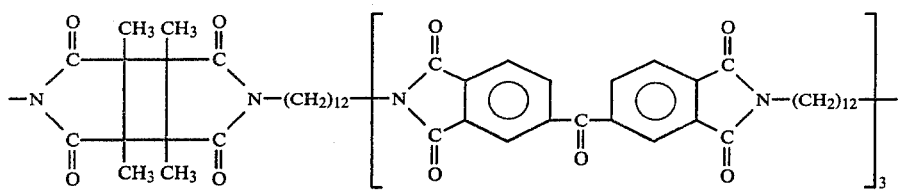

50. The copolyimide of claim 49 wherein the copolyimide is in the form of a molded object.
51. The copolyimide of claim 49 wherein the copolyimide is in the form of a laminate.
52. The copolyimide of claim 49 wherein the copolyimide is in the form of a film.
53. A copolyimide of the following recurring structure:

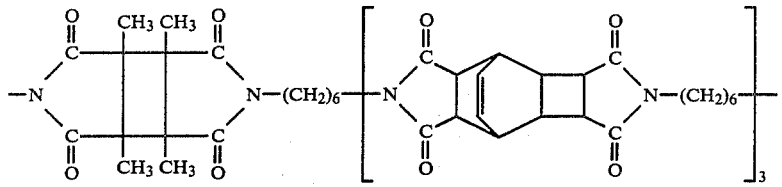

54. The copolyimide of claim 53 wherein the copolyimide is in the form of a molded object.
55. The copolyimide of claim 53 wherein the copolyimide is in the form of a laminate.
56. The copolyimide of claim 53 wherein the copolyimide is in the form of a film.
57. A copolyimide of the following recurring structure:

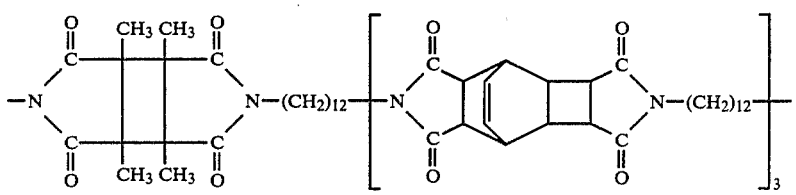

58. The copolyimide of claim 57 wherein the copolyimide is in the form of a molded object.
59. The copolyimide of claim 57 wherein the copolyimide is in the form of a laminate.
60. The copolyimide of claim 57 wherein the copolyimide is in the form of a film.
61. A copolyimide of the following recurring structure:

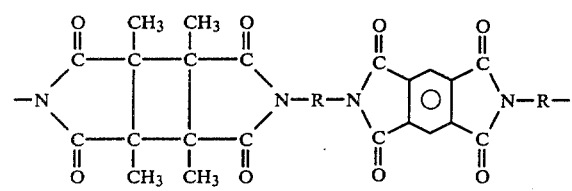

wherein R is a divalent aliphatic or aromatic hydrocarbon radical or an aromatic hydrocarbon radical containing 6 to 10 carbon atoms joined directly or by a stable linkage selected from the group consisting of —O—, methylene,

—SO—, —SO$_2$—, and —S— radicals.

62. The copolyimide of claim 61 wherein R is an aliphatic hydrocarbon from 2 to 18 carbon atoms.
63. The copolyimide of claim 61 wherein R is an aromatic hydrocarbon from 6 to 20 carbon atoms.
64. The copolyimide of claim 61 wherein the aromatic hydrocarbon radical contains from 6 to 10 carbon atoms joined directly or by stable linkage selected from the group consisting essentially of —O—, methylene,

—SO—, SO$_2$ and —S— radicals.

65. The copolyimide of claim 61 wherein the copolyimide is in the form of a molded object.
66. The copolyimide of claim 61 wherein the copolyimide is in the form of a laminate.
67. The copolyimide of claim 61 wherein the copolyimide is in the form of a film.
68. The copolyimide of claim 61 wherein the copolyimide is in the form of a metal coating suitable for electrical service.
69. The copolyimide of the following recurring structure:

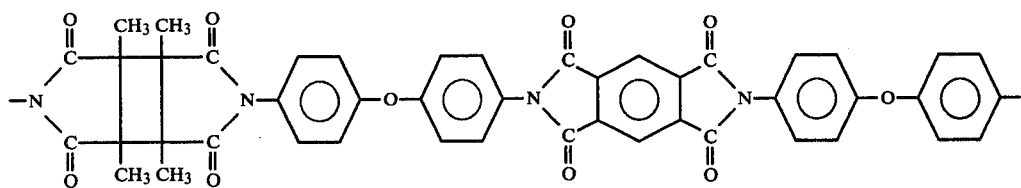

70. The copolyimide of claim 69 wherein the copolyimide is in the form of a laminate.

71. The copolyimide of claim 69 wherein the copolyimide is in the form of a molded object.

72. The copolyimide of claim 69 wherein the copolyimide is in the form of a film.

73. The copolyimide of the following recurring structure:

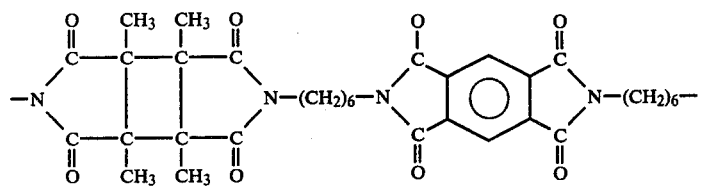

74. The copolyimide of claim 73 wherein the copolyimide is in the form of a laminate.

75. The copolyimide of claim 73 wherein the copolyimide is in the form of a film.

76. The copolyimide of claim 73 wherein the copolyimide is in the form of a molded object.

77. The copolyimide of the following recurring structure:

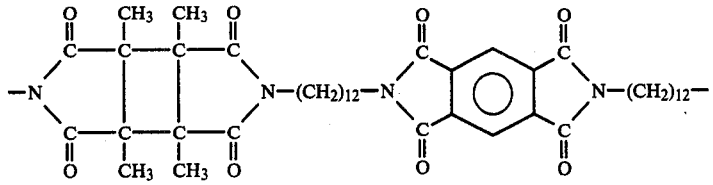

78. The copolyimide of claim 77 wherein the copolyimide is in the form of a film.

79. The copolyimide of claim 77 wherein the copolyimide is in the form of a laminate.

80. The copolyimide of claim 77 wherein the copolyimide is in the form of a molded object.

81. The copolyimide of the following recurring structure:

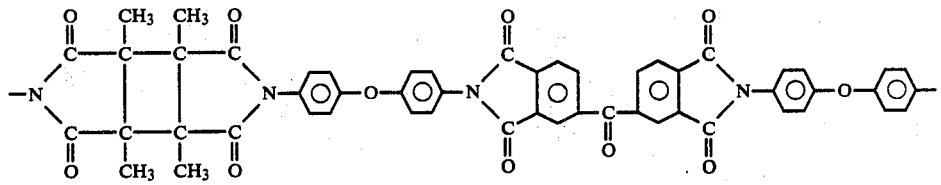

82. The copolyimide of claim 81 wherein the copolyimide is in the form of a film.

83. The copolyimide of claim 81 wherein the copolyimide is in the form of a laminate.

84. The copolyimide of claim 81 wherein the copolyimide is in the form of a molded object.

* * * * *

UNITED STATES PATENT OFFICE
CERTIFICATE OF CORRECTION

Patent No. 4,366,304           Dated December 28, 1982

Inventor(s) NIMRY, TAYSEER S. - FIELDS, ELLIS K.

It is certified that error appears in the above-identified patent and that said Letters Patent are hereby corrected as shown below:

| Column | Line | | |
|---|---|---|---|
| 2 | 7 | " 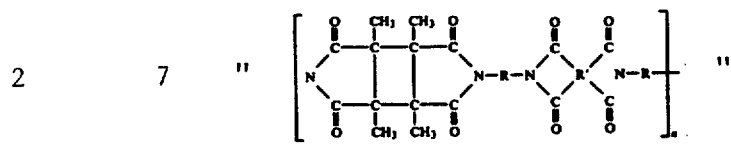 " should be -- 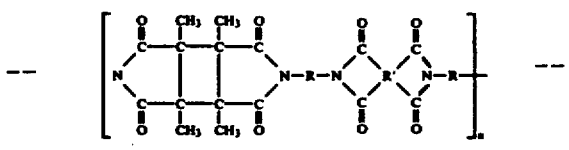 -- | |
| 3 | 39 | "2,2','3,3" should be -- 2,2',3,3' -- | |
| 3 | 47-48 | "[4,2,2,0$^{2,5}$]" should be -- [4,2,2,0$^{2,5}$] -- | |
| 3 | 53 | "3,3$^{1}$,4,4$^{2}$" should be -- 3,3',4,4' -- | |
| 4 | 32 | "[4,2,2,0$^{2,5}$]" should be -- [4,2,2,0$^{2,5}$] -- | |

UNITED STATES PATENT OFFICE
CERTIFICATE OF CORRECTION

Page 2 of 4

Patent No. 4,366,304     Dated December 28, 1982

Inventor(s) NIMRY, TAYSEER S. - FIELDS, ELLIS K.

It is certified that error appears in the above-identified patent and that said Letters Patent are hereby corrected as shown below:

Column  Line 9   9   "colororimetry"   should be   -- colorimetry --

17  30  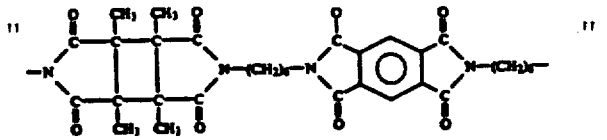"

should be

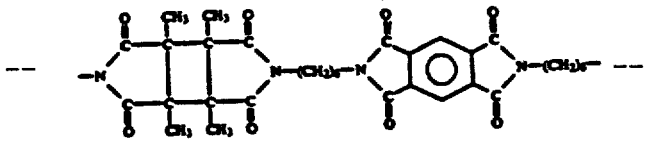--

UNITED STATES PATENT OFFICE
CERTIFICATE OF CORRECTION

Patent No. 4,366,304     Dated December 28, 1982

Inventor(s) NIMRY, TAYSEER S. - FIELDS, ELLIS K.

It is certified that error appears in the above-identified patent and that said Letters Patent are hereby corrected as shown below:

Col.   Line 11   35   "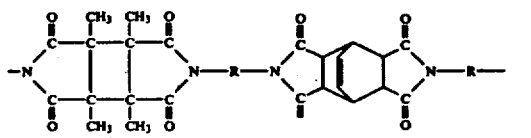"

should be

-- 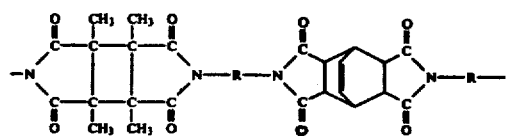 --

UNITED STATES PATENT OFFICE
CERTIFICATE OF CORRECTION

Patent No. 4,366,304  Dated December 28, 1982

Inventor(s) NIMRY, TAYSEER S. - FIELDS, ELLIS K.

It is certified that error appears in the above-identified patent and that said Letters Patent are hereby corrected as shown below:

Column  Line 13      35

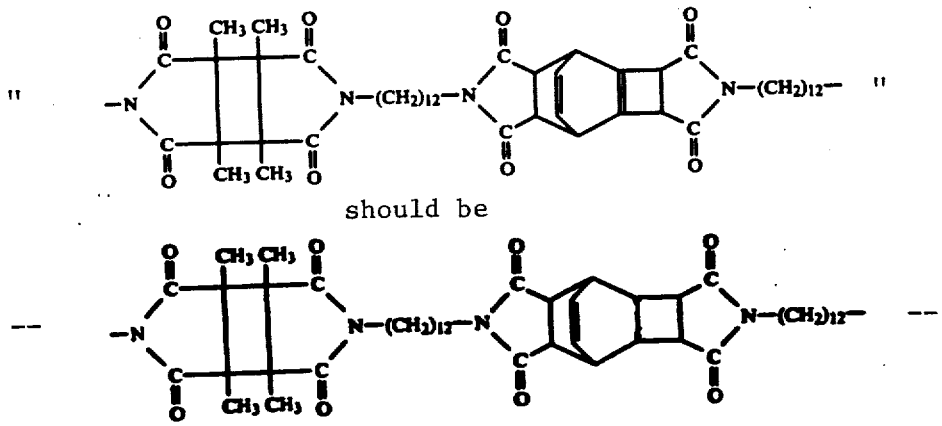

Signed and Sealed this

Ninth Day of July 1985

[SEAL]

Attest:

DONALD J. QUIGG

Attesting Officer    Acting Commissioner of Patents and Trademarks